US005973750A

United States Patent [19]

Ogawa et al.

[11] Patent Number: 5,973,750

[45] Date of Patent: Oct. 26, 1999

[54] TELEVISION CHANNEL SELECTION MONITORING APPARATUS

[75] Inventors: Junji Ogawa; Tadayuki Aoyama; Takahide Yoshioka, all of Tokyo, Japan

[73] Assignee: K.K. Video Research, Tokyo, Japan

[21] Appl. No.: 09/175,027

[22] Filed: Oct. 20, 1998

Related U.S. Application Data

[63] Continuation of application No. 08/831,859, Apr. 2, 1997, abandoned.

[30] Foreign Application Priority Data

May 11, 1996 [JP] Japan .................................... 8-308759

[51] Int. Cl.$^{6}$ ...................................................... H04N 5/50

[52] U.S. Cl. ............................. 348/570; 348/731; 348/4; 348/547; 455/6.2; 455/2; 455/154.1

[58] Field of Search .................................... 348/570, 569, 348/731, 1, 4, 540, 547; 455/6.2, 2, 154.1, 158.2, 158.4

[56] References Cited

U.S. PATENT DOCUMENTS

| | | | |
|---|---|---|---|
| 3,919,479 | 11/1975 | Moon et al. | 348/4 |
| 4,081,797 | 3/1978 | Olson | 348/570 |
| 4,317,225 | 2/1982 | Henderson et al. | 348/570 |
| 4,430,671 | 2/1984 | Tamer | 358/192.1 |
| 4,525,740 | 6/1985 | Borg | 348/570 |
| 4,559,561 | 12/1985 | Amano et al. | 348/570 |
| 4,677,466 | 6/1987 | Lert et al. | 348/4 |
| 4,697,209 | 9/1987 | Kiewit et al. | 348/1 |
| 4,739,398 | 4/1988 | Thomas et al. | 348/1 |
| 4,857,999 | 8/1989 | Welsh | 348/4 |
| 5,010,499 | 4/1991 | Yee | 364/521 |
| 5,305,464 | 4/1994 | Frett | 348/1 |
| 5,512,955 | 4/1996 | Toyoshima et al. | 348/569 |
| 5,572,246 | 11/1996 | Ellis et al. | 348/2 |
| 5,659,366 | 8/1997 | Kerman | 348/460 |
| 5,661,526 | 8/1997 | Hamamoto | 348/460 |
| 5,675,390 | 10/1997 | Schindler et al. | 348/552 |
| 5,699,106 | 12/1997 | Matsubara et al. | 348/569 |

*Primary Examiner*—Andrew I. Faile
*Assistant Examiner*—Reuben M. Brown

[57] ABSTRACT

A television channel selection monitoring apparatus for identifying the broadcast channel to which a television receiver means is tuned at any given time is disclosed. Instead of relying for the channel identification on the local oscillation frequency at the tuner of such television receiver means, the apparatus of the present invention utilizes the recognition of the channel identification number superimposed on the video signal received through the selected channel so that the image of the superimposed channel number may appear, for a certain duration following the channel selection, at a predetermined area of the image corresponding to the video signal.

6 Claims, 7 Drawing Sheets

FIG. 2A
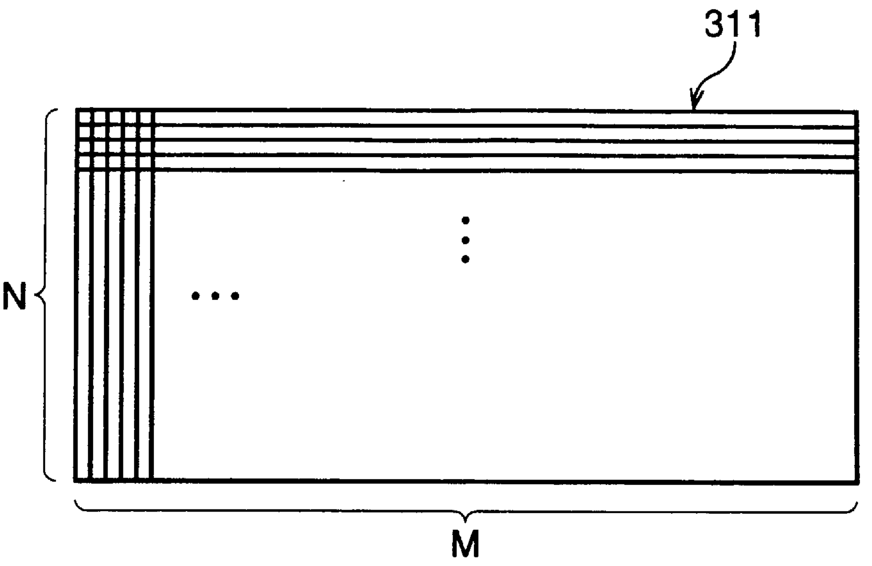
FIG. 2B
321
| | Upper Left | Lower Right |
|---|---|---|
| $k_1$ | C11 | C12 |
| $k_2$ | C21 | C22 |
| $k_3$ | C31 | C32 |
FIG. 2C
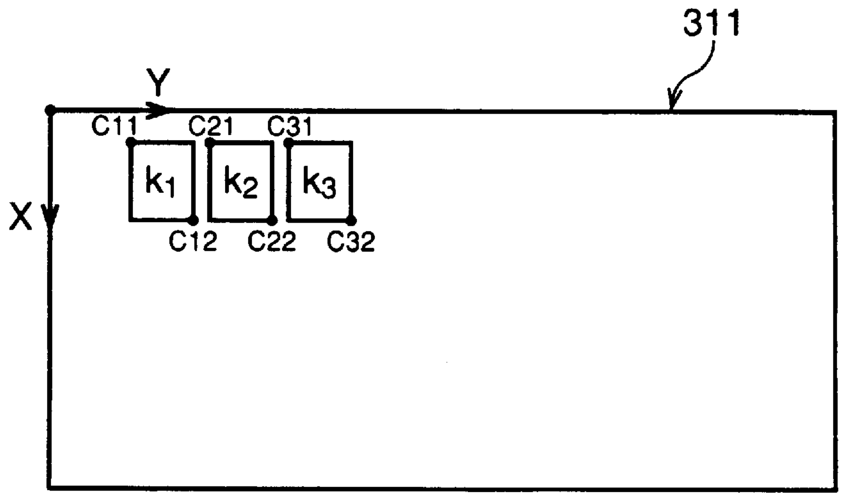

| | |
|---|---|
| $C_1$ | 200 |
| $C_2$ | 210 |
| $C_3$ | 301 |
| ⋮ | ⋮ |
| $C_n$ | 991 |

TELEVISION CHANNEL SELECTION MONITORING APPARATUS

This application is a continuation of 08/831,859 filed Apr. 2, 1997, abandoned.

BACKGROUND OF THE INVENTION (1) Field of the Invention

The present invention relates to a television channel selection monitoring apparatus for detecting the television channel to which the television receiver equipment was tuned at any given time and, more particularly, to a monitoring apparatus of this type adapted to identify a television channel selected out of those broadcast through a communication satellite in digital form (CS digital broadcast), through a CATV network or through a conventional ground wave broadcast system.

(2) Description of the Related Art

In the broadcast industry, the so-called ratings indicative of audience size for each of the programmings are important, particularly for determining advertising rates and for adjusting programming. To calculate the ratings, the viewing habits of sample households must be monitored non-obtrusively without disturbing such habits.

For that purpose, an apparatus called television (TV) sensor is conventionally connected to each of the monitored objects such as television sets or video tape recorders installed at sample households, so that data as to the television channels viewed and the times of viewing for each of those monitored objects may be obtained and that such data may be supplied to a central computer through telephone lines periodically.

One example of such TV sensor to be placed at sample households, which is disclosed in the Japanese Patent Application Kokai Publication No. H4-4626, is adapted to pick up local oscillation frequency of the tuner of the monitored equipment to permit the detection of the channel, to which the monitored equipment is tuned to. This is based on the fact that such channel and local oscillation frequency are in one to one correspondence to each other.

While such prior art channel detection techniques based on the local oscillation detection at tuner have been usable for the detection of television channels of ordinary broadcast system based on analog signal transmission such as the existing ground wave broadcast system or the FM-based satellite analog broadcast system, they are not applicable to CS digital broadcast. It is because the CS digital broadcast employs the digitization and data compression of video and/or audio signals to achieve the multiplexed transmission of four to eight television channels through a single satellite transponder, which makes it impossible to use the conventional tuner local oscillation frequency-based identification of channels to which the receiving equipment is tuned.

SUMMARY OF THE INVENTION

An object of the present invention is therefore to provide a television channel selection monitoring apparatus capable of identifying the television channels to which the receiving equipment is tuned, regardless of whether such channels are provided by CS digital broadcast, CATV digital broadcast, or conventional CATV, satellite or ground wave broadcast.

According to the present invention, there is provided a television channel selection monitoring apparatus for monitoring reception status of a television receiver means coupled to a display means for the display of an image responsive to an input video signal supplied thereto, said television receiver means being capable of selecting one of a plurality of television channels broadcast through a satellite, CATV or ground wave broadcast system and providing to said display means as said input video signal a video signal received through said selected one of the television channels, said input video signal having a predetermined channel number indication section for indicating on said display means a channel number for each of said television channels for a predetermined duration every time channel selection is made at said television receiver means, wherein said apparatus comprises: means for digitizing said video signal and temporarily storing a digitized video signal from said digitizing means for at least a part of each frame of said video signal; means for extracting out of said digitized video signal an image section corresponding to said channel number indication section, thereby to provide a digitized image of said channel number; means responsive to said digitized image of said channel number for identifying it as a channel number to which said television receiver means is tuned; and means for outputting said channel number as an element of said reception status.

To receive the CS digital broadcast, for example, a CS digital broadcast receiver is placed adjacently to an ordinary television (TV) set, with the video/audio output terminals of the CS digital broadcast receiver connected respectively to the video/audio input terminals of the TV set. Then, the video/audio input terminals receiving the CS digital broadcast video/audio output signals are selected as an input source for the TV set and a desired broadcast programming is selected by remote control unit associated with the CS digital broadcast receiver. This permits the image of the video signal of a selected CS digital broadcast channel to be put on the display screen of the TV set with its associated audio output.

In the ordinary mode of use, where a certain television programming is being continuously viewed by the viewer, the display screen shows only the image corresponding to the video signal actually received through the broadcast channel. However, the change of channels by the viewer results in the superimposition of a channel number on a predetermined part of the image on display for a certain period of time, which function is provided by the CS digital broadcast receiver to indicate to the viewer the new channel number. The position of the superimposed channel number in the displayed image is always fixed.

The television channel selection monitoring apparatus of the present invention is based on the recognition of these channel numbers, which appear as superimposition at predetermined positions of the image on display for a certain period of time immediately following the channel switching by the viewer. Since the superimposition of channel numbers on the image on display for a certain period of time immediately following the channel switching is employed not only in the above-described CS digital broadcast receiver but also in CATV broadcast or ordinary ground wave broadcast receiver equipment, the apparatus of the present invention is applicable to channel selection monitoring at a receiver equipment for any of these broadcast systems, in contrast to the conventional tuner local oscillation frequency-based channel identification apparatus described above.

To enhance the reliability of the channel number identification achieved by the apparatus of the present invention, a broadcast reception detection unit may additionally be employed, which is capable of providing a validation signal for the identified channel number, so that such identified channel number may be outputted only when the reception of the video signal over the CS digital broadcast system, CATV or ordinary ground wave broadcast system has been confirmed.

For that purpose, the broadcast reception monitoring unit adapted to CS digital broadcast, for example, is arranged to phase-compare the vertical hold and horizontal hold signals separated from the video signal from the CS digital broadcast receiver with the vertical hold and horizontal hold signals extracted at the TV set from the video signal on display screen. The same circuit arrangement is applicable to the broadcast reception detection unit adapted to CATV and other broadcast mentioned above. The validation of the identified channel number is needed when a CATV digital broadcast receiver or a CATV broadcast receiver is used, as assumed in the above description, as an external receiver connected to the ordinary TV set, which has a display device for displaying an image corresponding to the video output from such external receiver as well as to the video signal produced in the TV set itself. This is because the viewer can select the video signal produced in the TV set itself for display on the display device of the TV set, while keeping the external receiver powered-on, allowing the channel number identification to be performed at the channel selection monitoring apparatus to provide at its output the identified channel number to which the external receiver is turned but which is not actually viewed by the viewer. Another reason for the use of the validation is that the superimposition of a channel number lasts only for a predetermined period of time immediately following the turn-on of the power switch or the channel selection at the external receiver, which can result in the absence of the identified channel number output at the time point where the viewer operates the video input selector of the TV set to display the image corresponding to the output video signal supplied from the external receiver. It will be seen that such absence of the identified channel number can be avoided by keeping the channel number identifying function maintained regardless of whether the image corresponding to the output from the external receiver is being actually viewed or not.

Also, when the TV set is equipped with a video signal output terminal, as is often the case with recent high-performance models adapted to multimedia environment, the video signal available from such video signal output terminal corresponds to the image displayed on the screen of the TV set. Therefore, when a CS digital broadcast receiver and/or a CATV broadcast receiver is connected to such a TV set, the video signal provided from such video signal output terminal makes it possible to identify the viewed channel, regardless of whether the video signal is from the CS digital broadcast receiver, or CATV broadcast receiver, or the TV set itself. In other words, with the use of a video signal output terminal-equipped TV set, to which the CS digital broadcast receiver or CATV broadcast receiver is connected, the apparatus of the present invention is capable of identifying any television channel viewed, whether it is provided by CS digital broadcast system or CATV broadcast system or ordinary ground wave broadcast system. This greatly facilitates the installation of the channel selection monitoring apparatus at sample households because of its multipurpose capability with non-obtrusiveness and limited physical size.

BRIEF DESCRIPTION OF THE DRAWINGS

The above and other objects, features and advantages of the present invention will be apparent from the following description of preferred embodiments of the invention taken with reference to the accompanying drawings, in which

FIGS. 2A, 2B and 2C illustrate examples of memory location arrangement of image memory, lay-out of monitored areas, and assignment of memory locations, respectively;

PREFERRED EMBODIMENTS OF THE INVENTION

Figure 1:
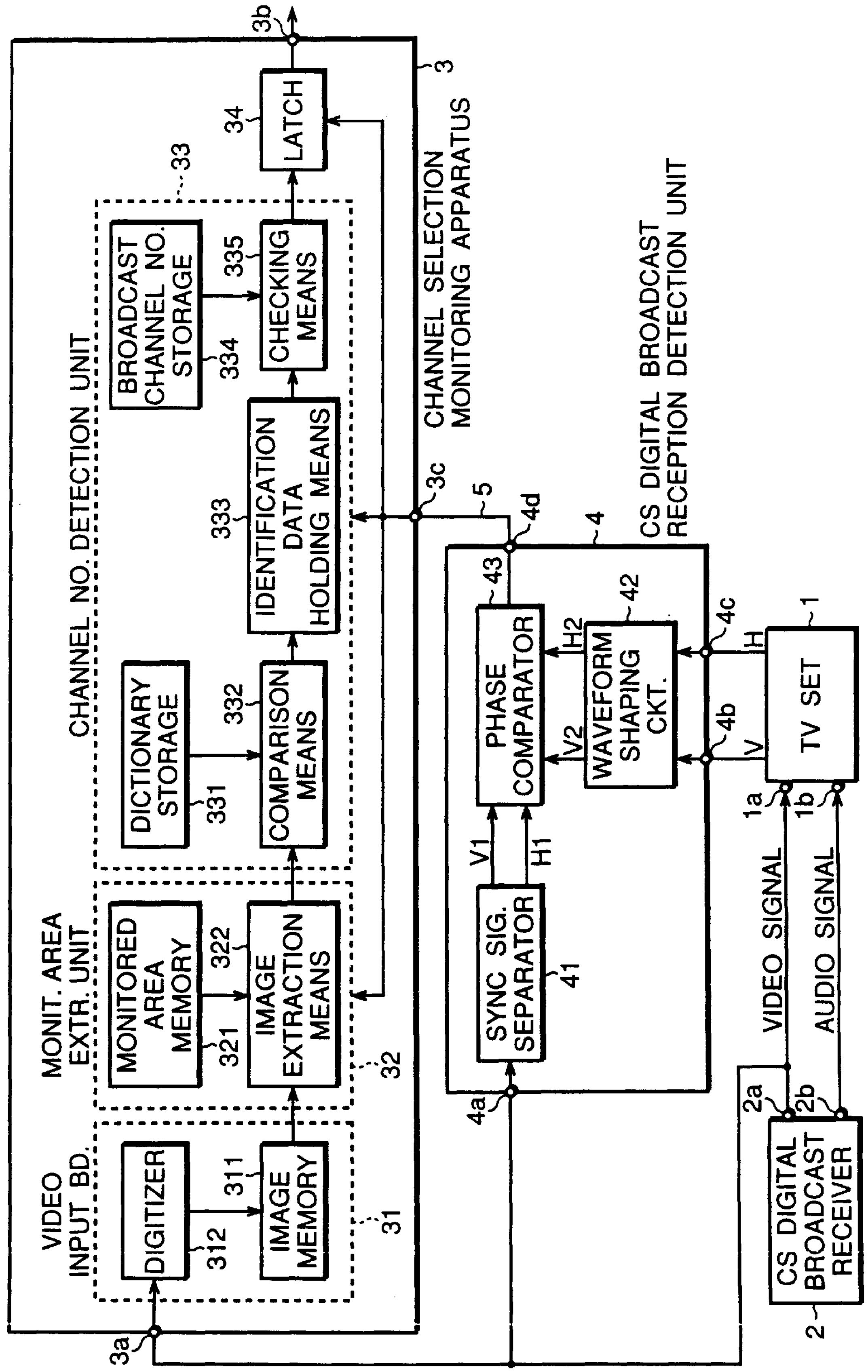
FIG. 1 is a block diagram of a preferred embodiment of the present invention.

Referring now to FIG. 1, which shows in blocks a preferred embodiment of the present invention, 1 denotes an ordinary TV set having video input terminal 1*a* and audio input terminal 1*b*; and 2, a CS digital broadcast receiver capable of providing video and audio output signals through its video output terminal 2*a* and its audio output terminal 2*b*. These output terminals 2*a* and 2*b* are connected respectively to video and audio input terminals 1*a* and 1*b* of TV set 1. To view at TV set 1 a certain programming of the CS digital broadcast, the viewer selects at TV set 1, by its remote control unit not shown, input terminals 1*a* and 1*b* as input source for TV set 1 and, also selects by a similar remote control unit a channel for that programming at CS digital broadcast receiver 2. This causes the video and audio signals of the selected channel supplied from CS digital broadcast receiver 2 to be displayed and outputted at TV set 1. Video output terminal 2*a* of the CS digital broadcast receiver 2 is also connected co input terminals 3*a* and 4*a* of channel selection monitoring apparatus 3 and CS digital broadcast reception detection unit 4, respectively.

The CS broadcast video signal supplied through input terminal 3*a* is supplied to a video input board 31 adapted to digitize the video signal by video digitizer 312 and to temporally store the digitized video signal in image memory 311 having N×M data storage locations as shown in FIG. 2A. These values N and M are decided to accommodate the digitized image section corresponding at least to the CS broadcast channel numbers superimposed on the broadcast image. The read-out of the image memory 311 can be performed once for every frame of the video signal or, alternatively, once for every plurality of frames. It is sufficient for the read-out to be performed at least once for the duration of each superimposed channel number. Image memory 311 may consist of a dual-port RAM adapted to store video signals. Also, the image reproduction by the use of image memory 311 may be in full scale identical in size to the displayed image at TV set 1 or, alternatively, in reduced scale to provide the reproduction of images of reduced size. Furthermore, as indicated above, the entire image need not be reproduced. The reproduction of only that part of the image which includes the superimposed channel number is sufficient.

The output of image memory 311 is applied to monitored area extraction unit 32 for extracting that portion of the temporarily stored digitized video signal which corresponds to the image of a predetermined area thereof. The predetermined area is the channel number indicating area where the channel numbers are superimposed for a prefixed duration immediately following the channel selection. For this purpose, monitored area extraction unit 32 has monitored area memory 321 for storing the monitored area for each digit of the channel number superimposed on the image, and image extraction means 322 for extracting the image corresponding to each of the monitored areas defined by monitored area memory 321. Monitored area memory 321 may consist of ROM and/or EEPROM and, image extraction means 322 may consist of an MPU (e.g., INTEL 486DX4) and a control program.

An example of the content of monitored area memory 321 assuming three digits for each of the channel numbers is shown in FIG. 2B, and the location of the respective monitored areas of image memory 311 is shown in FIG. 2C. In FIG. 2C, k1, k2 and k3 respectively denote monitored areas corresponding respectively to the most significant, the second most significant and the least significant digits of a channel number; and C11 and so forth shown at upper left and lower right corners of each of the monitored areas denote upper left and lower right corner points of each of the monitored areas. More specifically, monitored area k1 for the most significant digit is a rectangular area having points C11 and C12 at upper left and lower right corners, respectively; monitored area k2 for the second most significant digit is a rectangular area having points C21 and C22 at upper left and lower right corners, respectively; and monitored area k3 for the least significant digit is a rectangular area having points C31 and C32 at upper left and lower right corners, respectively. Also, points C11 and so forth are defined by XY coordinates (scales corresponding to the number of unit memory locations), with the unit memory location at the upper left corner of image memory 311 serving as the original point. It will be noted that points C11 and so forth are at the following unit memory locations:

| | |
|---|---|
| C11 (2, 7) | C12 (11, 14) |
| C21 (2, 17) | C22 (11, 24) |
| C31 (2, 27) | C32 (11, 34) |

In this case, the monitored area for each digit of the three-digit channel number is of 9×7 size, with 9 unit memory locations lying longitudinally while 7 unit memory locations lying laterally.

Image extraction means 322 extracts, out of the images stored in image memory 311 and with reference to the output from monitored area memory 321 representative of the above-described monitored areas, the binary images occupying the monitored areas. The extracted binary image is supplied to channel number identification unit 33.

Channel number identification unit 33, adapted to detect the channel number contained in the extracted binary image supplied from image extraction unit 32, comprises: dictionary storage 331 for registering in advance a binary image for each of all possible numerals and letters constituting the superimposed channel numbers; comparison means 332 for comparing the extracted binary image from image extraction means 322 with the binary image registered in dictionary storage 331 to identify the numeral or letter contained in the image of each monitored area, thereby to provide a sequence of identified characters; identification data holding means 333 for holding the identified character sequence; broadcast channel number storage 334 for storing in advance channel numbers of all the broadcast channels receivable by CS digital broadcast receiver 2; checking means 335 for comparing the identified character sequence held at identification data holding means 333 with the channel number stored at broadcast channel number storage 334 to provide coinciding characters to data latch 34. Dictionary storage 331 and broadcast channel number storage 334 may consist of ROM and/or EEPROM. Comparison means 332, identification data holding means 333 and checking means 335 may be composed of an MPU (e.g., INTEL 486DX4) and control programs.

Figures 3, 6:
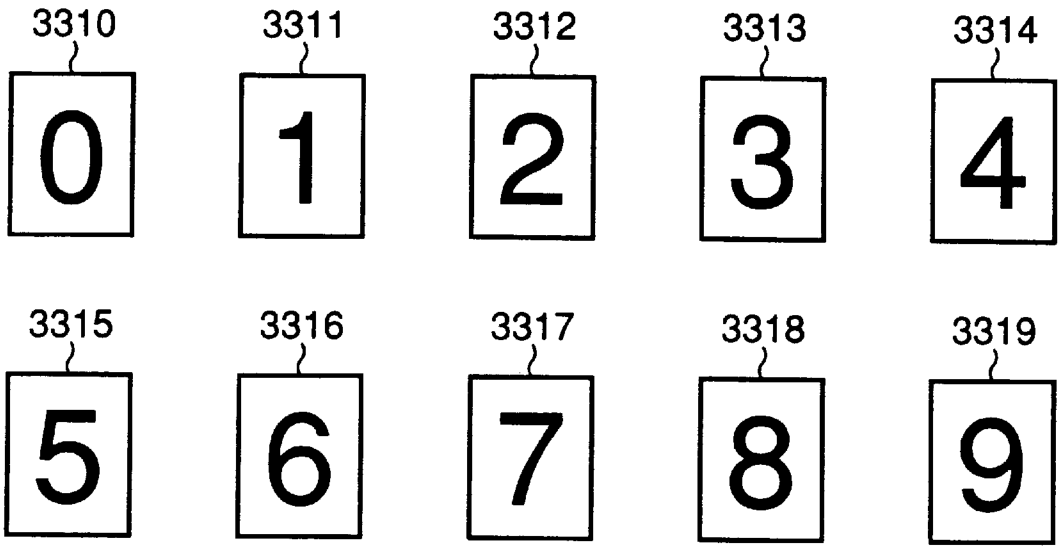
FIG. 3 illustrates an example of a dictionary registered in dictionary storage.
FIG. 6 illustrates an example of the contents of broadcast channel storage.

Referring to FIG. 3 showing an example of the contents of dictionary storage 331 for each of the digits of the three-digit channel numbers superimposed on the video output image consists of ten kinds of numerals 0 to 9. In this drawing, numerals 3310–3319 denote dictionaries respectively for numerals 0 to 9 each having a size identical to the monitored area for each digit defined by monitored area memory 321. More specifically, the above-mentioned size of 9×7 unit memory locations of image memory 311 for each of monitored areas k1, k2 and k3 shown in FIG. 2C is identical to the size of each of the above dictionaries, so that the comparison of extracted digit from image extracting means 322 with a series of dictionaries 3310–3319 can be made by comparison means 332 on the basis of contents of respective unit memory locations.

Figure 4:
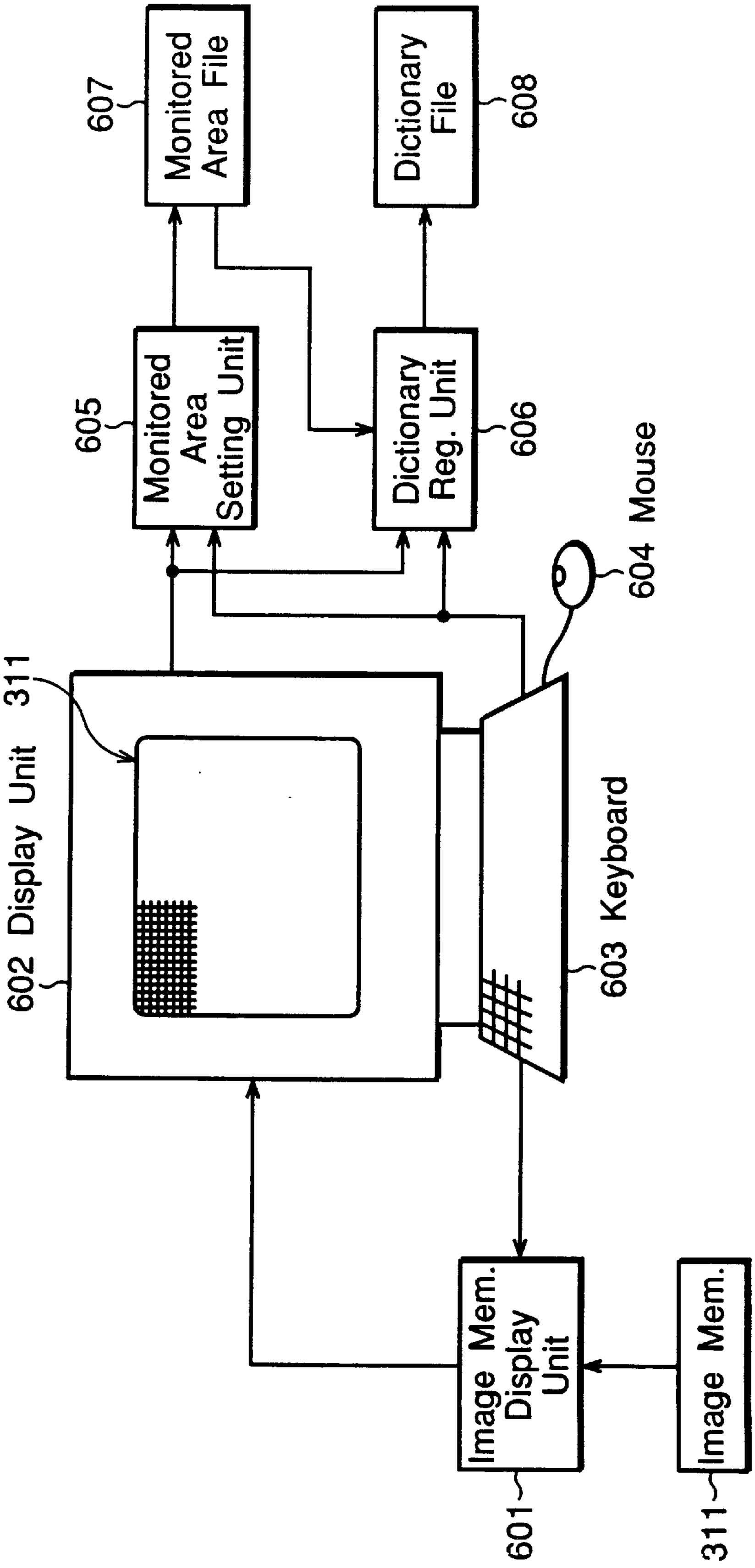
FIG. 4 is a schematic diagram illustrating how the dictionary information to be registered in the dictionary storage and monitored area to be arranged in monitored area memory are provided.

Referring now to FIG. 4, description will be given about how the monitored area is defined in monitored area memory 321 and how dictionary storage 331 is provided.

Referring to FIG. 4, the content of image memory 311 (FIG. 1) is read, under control by a personal computer (e.g., Toshiba Dyna Book GT-R575), by image memory display unit 601 for continuous display on the screen of display unit 602 of the computer. The channel selection at CS digital broadcast receiver 2 by the user's operation of remote control unit causes a new channel number to be superimposed on the displayed image, with the result that the new channel number appears also in the content of image memory 311 as well as on display unit 602. Upon appearance of the three-digit channel number, the user keys in from keyboard 603 a temporary stop instruction to image memory display unit 601, bringing into still state the image including the channel number superimposed on the image put on display unit 602. The user then keys in from keyboard 603 a monitored area setting instruction to monitored area setting means 605 and then, by the use of mouse 604, points on the display screen the upper left and lower right corners of the monitored area for each digit of the channel number. Monitored area setting unit 605 detects the upper left and lower right corners of each of the digits mouse-pointed by the user for registration in monitored area file 607. Thus, data on monitored area to be registered in monitored area memory 321 (FIG. 1) are obtained.

Similarly to the above procedure, the user brings into still state the displayed image upon superimposition on the image on display unit 602 of the channel number including 0 and, after keying in dictionary setting instruction from keyboard 603, points at the 0 portion of the channel number by the use of mouse. Dictionary registration means 606 is adapted to extract from monitored area file 607 a monitored area including the positions mouse-pointed by the user, and to input, out of the images stored in image memory 311 and displayed on display unit 602, the image within the extracted monitored area, and to convert it into binary image by smoothing process and background coloring, thereby to prepare figure 0-associated dictionary (an image of numeral portion of logic "1," and background portion of logic "0," for example) for registration in dictionary file 608. In a similar manner, numeral 1- to 9-associated dictionaries to be registered in dictionary storage 331 in FIG. 1 can be obtained.

Figure 5:
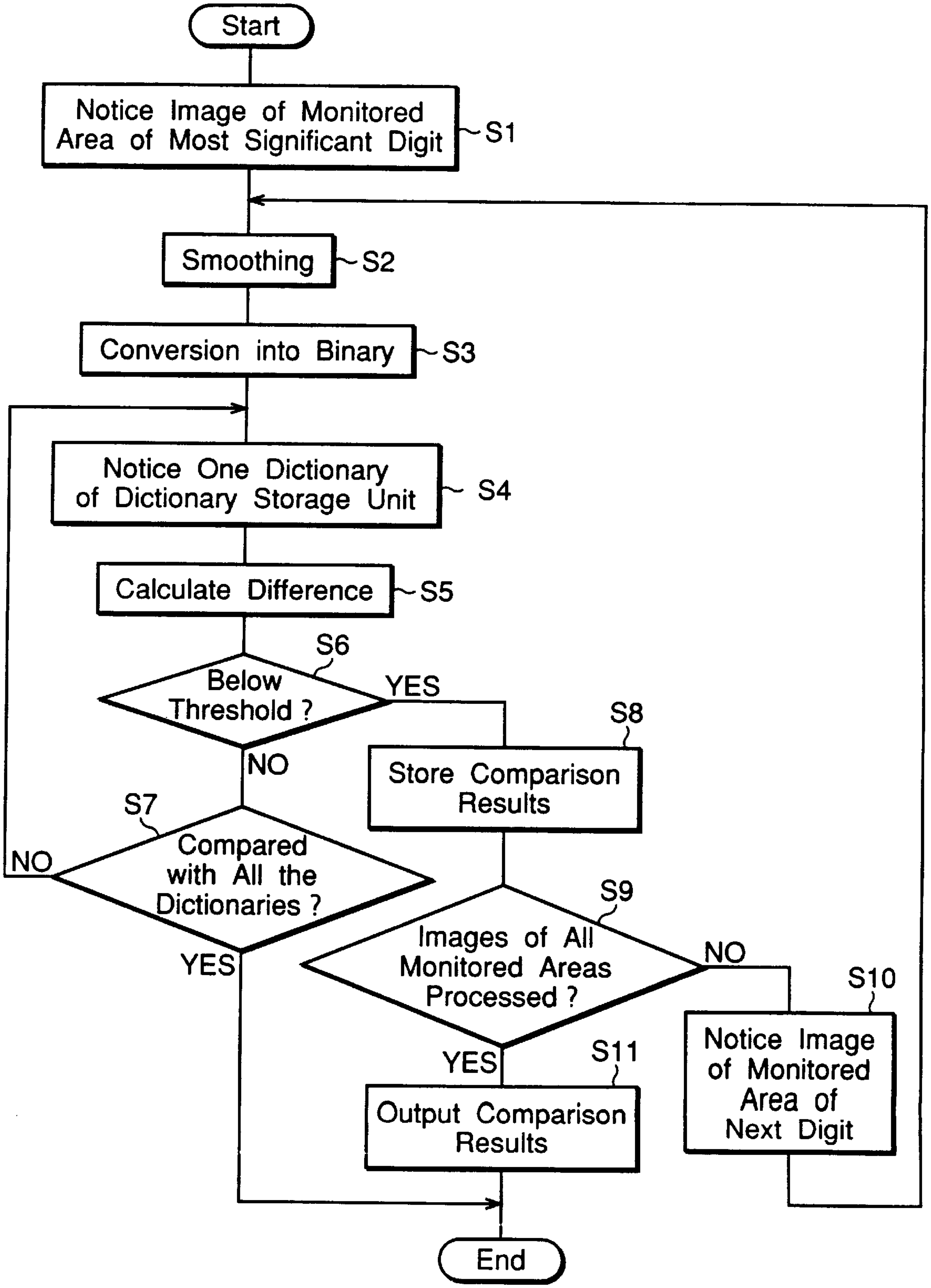
FIG. 5 shows a flow chart illustrating data processing at comparator.

Referring to FIG. 5 showing a flow chart of the data processing at comparison means 332, the operation of channel selection monitoring apparatus 3 will now be described.

Comparison means 332 starts the processing shown in FIG. 5 when the image of the monitored area for each digit is supplied from image extraction means 322. The image of the monitored area for the most significant digit is processed first (Step S1), to subject the image to smoothing process and to conversion into binary image similar to the one applied when the dictionary was prepared (Steps S2 and S3), to provide a binary image of the monitored area. Binary image of one dictionary data out of dictionary storage 331 is then read out, to extract its difference from the binary image of the monitored area, and thereby to check whether the difference is below a predetermined threshold value (Steps S4–S6). If the difference is smaller than the threshold value, the binary image of the monitored area is that of the numeral associated with the just-read dictionary data, and the data of that numeral is stored (Step S8). If the difference is greater than the threshold value, the binary image of the next dictionary is read from dictionary storage 331 for similar processing. If none of the dictionary data provides output making the difference smaller than the threshold value (YES in Step S7), it indicates that the monitored area did not have a numeral constituting the channel number, permitting the processing to be terminated.

Upon storing of the comparison result for the image of the monitored area of the most significant digit, the image of the monitored area for the next most significant digit is processed (Step S10), with the processing returning to step S2. If the comparison result is obtained for the image of every monitored area (YES in Step S9), the comparison outputs arranged in the order from those for the most significant digit to those for the least significant digit are supplied to identification data holding means 333 (Step 11), allowing the processing to be terminated.

The output of identification data holding means 333 is supplied to checking means 335, which compares that output with the channel numbers stored in advance in broadcast channel number storage 334 to provide coinciding channel number to data latch 34, or to disregard as error the same output, if there is no coincidence with any one of the stored channel numbers. As stated above, broadcast channel number storage 334 stores the channel numbers for all the broadcast channels receivable by CS digital broadcast receiver 2. In other words, there are no other channel numbers than those stored there. Therefore, those channel numbers indicated by the comparison result which are other than those stored are excluded at checking means 335 to enhance the reliability of channel identification.

Figure 7:
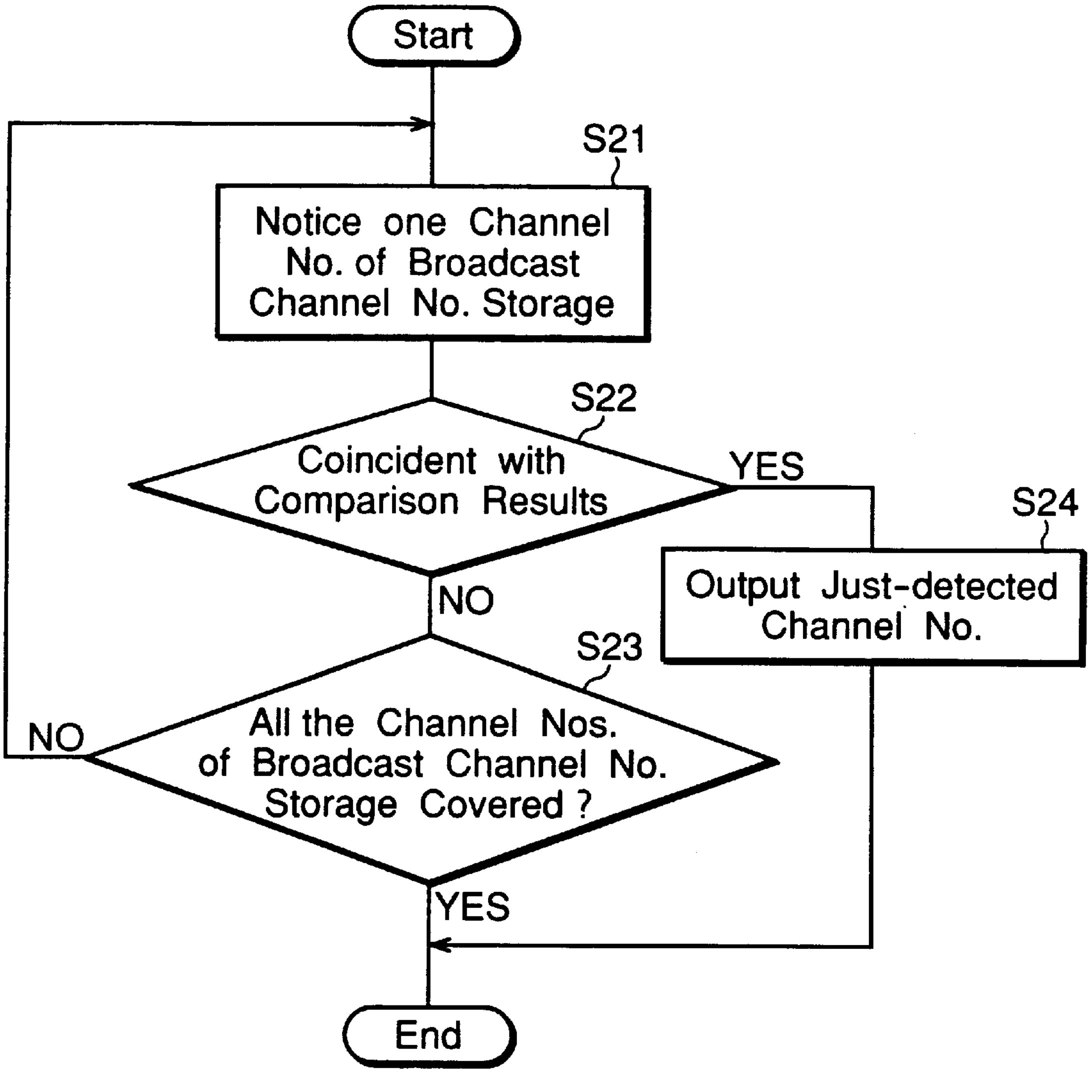
FIG. 7 shows a flow chart illustrating data processing at checking means.

FIG. 6 shows an example of the content of broadcast channel number storage 334, and FIG. 7 shows a flow chart of data processing at checking means 335. Broadcast channel number storage 334 is adapted to store, for each of all the broadcast channels receivable by CS digital broadcast receiver 2, identifiers C1-Cn, and channel numbers such as "200" corresponding to those identifiers, respectively.

Checking means 335 begins the processing shown in FIG. 7, every time a new comparison result is supplied to identification data holding means 333. First, one of the channel numbers stored in broadcast channel number storage 334 is taken up for processing (Step S21), and determined whether it coincides with the comparison result stored in identification data holding means 333 (Step S22). When they are coincident, the just-taken up channel number is outputted to latch 34 (Step S24). If there is no coincidence, the next channel number in broadcast channel number storage 334 is taken up for similar processing. If there is no channel number matching the just-obtained comparison result (YES in Step S23), the comparison result is decided to be error, allowing the processing to be terminated.

Latch 34 shown in FIG. 1 is adapted to hold the channel number outputted from checking means 335 for output from output terminal **3*b* of channel selection monitoring apparatus 3 as a viewed channel number to which the CS digital broadcast receiver 2** was tuned.

The preferred embodiment shown in FIG. 1 may have an additional structured element, i.e., CS digital broadcast reception detection unit 4, which is adapted to detect the output video signal of CS digital broadcast receiver 2 being actually displayed at TV set 1. CS digital broadcast reception detection unit 4 receives at input terminal **4*a* the video signal from video output terminal 2*a* of CS digital broadcast receiver 2. The vertical hold signal V1 and horizontal hold signal H1 are separated at synchronizing signal separator circuit 41 from the CS digital broadcast video signal and are supplied to phase comparator 43. on the other hand, vertical and horizontal hold signals V and H are detected respectively by V synchronization signal sensor (not shown) positioned closely to the deflection yoke of the cathode-ray tube of TV set 1 and by H synchronization signal sensor (not shown) positioned closely to the flyback transformer of TV set 1. These vertical hold and horizontal hold signals V and H are waveform-shaped by shaping circuit 42, and supplied as vertical hold signal V2 and horizontal hold signal H2 to phase comparator 43. Phase comparator 43 is adapted to perform phase comparison between vertical hold signals V1 and V2 and between horizontal hold signals H1 and H2 and, when there is coincidence in both the vertical and horizontal hold signals, brings to active (or high) level the two-valued CS digital broadcast reception indication signal 5 outputted from detection output terminal 4*d* to control input terminal 3*c*, indicating that a CS digital broadcast signal is being received. When there is no coincidence in either one of them, signal 5** is at non-active (or low) level, indicating that a CS digital broadcast signal is not being received.

CS digital broadcast reception detection unit 4 is based on the fact that if the video signal actually on display at TV set 1 is identical to the CS digital broadcast video signal whose channel number has been identified, vertical and horizontal hold pulses of both video signals are most likely to coincide, and that if they differ the probability of coincidence of these synchronizing pulses are considerably low. Various modifications are possible to circuit construction of CS broadcast reception detection unit 4. For details, reference is made, for example, to Japanese Patent Application Kokai Publication H5-327639 assigned to the same assignee as the present application.

As described above, CS digital broadcast reception indicating signal 5 in active level is supplied through control input terminal **3*c* to channel selection monitoring apparatus 3 during the period in which the channel number of CS digital broadcast under reception is being identified. The signal 5 enables monitored area extraction unit 32, channel number detection circuit 33 and data latch 34, only when it is in active level. Thus, the signal 5 validates the detection output of unit 3 when it is in active level. These units 32, 33 and 34 remain inactive when signal 5 is in inactive level. This results in invalidation of selected channel number detected by channel detection unit 3, while TV set 1 is displaying an image corresponding to a video signal from TV set itself The above-described validation/invalidation scheme permits the selected channel number detection to be continuously performed regardless of which video signal is actually on display at TV set 1, avoiding the absence of the detection output at the time point where the viewer selects the video output from CS digital broadcast receiver 2 to put on actual display at TV set 1. While the validation of channel detector unit 3 is achieved in the above embodiment by applying active-level CS digital broadcast reception indicating signal 5, various other alternative circuit structures may be employed such that signal 5 is applied to an equipment (not shown) adapted to validate the output of channel selection monitoring 3** during the reception of CS digital broadcast and to invalidate the same otherwise.

As described above, the embodiment shown in FIG. 1 makes it possible to identify a CS digital broadcast channel to which CS digital broadcast receiver 2 is tuned for viewing at TV set 1, only by connecting, to receiver 2 and TV set 1, channel selection monitoring apparatus 3 and CS digital broadcast reception detection unit 4.

While the above-described embodiment is arranged to identify a CS digital broadcast channel to which CS digital broadcast receiver 2 is tuned, the same embodiment is usable for the channel number identification of a CATV broadcast receiver. In that mode of operation, a CATV broadcast receiver with video/audio output terminals corresponding to terminals 2*a* and 2*b* is connected, in place of receiver 2, to TV set 1, channel selection monitoring apparatus 3 and reception detection unit 4, which may then be called CATV broadcast reception detection unit. Since the principle of the viewed channel identification based on the superimposed channel number is equally applicable to such a CATV broadcast receiver, structural elements of each of units 3 and 4 do not require any substantial modification. However, since it is most likely that a CATV broadcast receiver has the superimposed channel number position different from that in a CS digital broadcast receiver, monitored area memory 321 and image extraction means 322 will require slight modifications. Such modifications can be easily achieved by the use of monitored area setting circuit 605 (FIG. 4). Also, the CATV broadcast may be in digital form since the present channel identification technique is applicable regardless of whether the broadcast signal is in analog or digital form.

Figure 8:
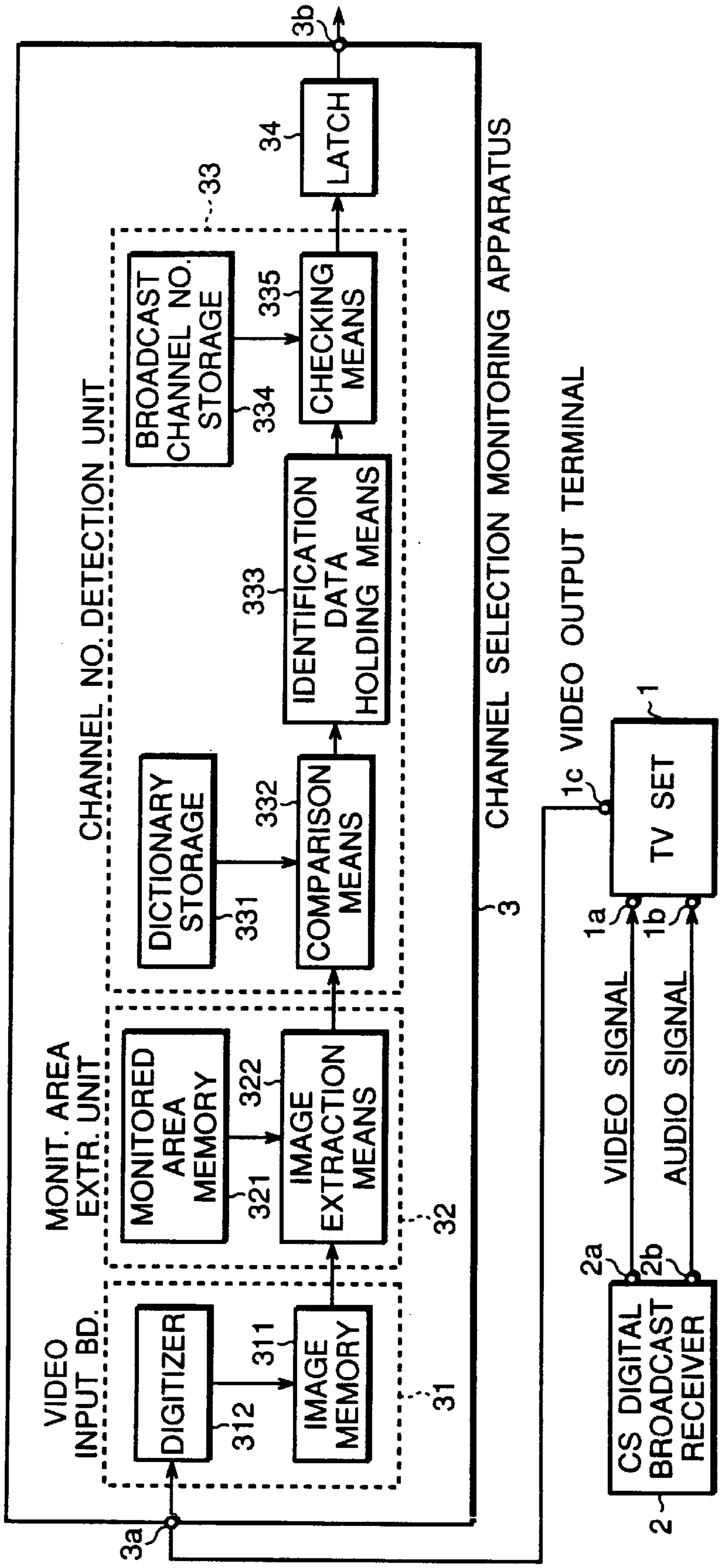
FIG. 8 is a block diagram of another embodiment of the present invention.

Referring to FIG. 8 showing in blocks another embodiment of the invention with like reference numerals shown in FIG. 1 denoting like structural elements, TV set 1 has video output terminal 1*c* as is often the case with recent models. With such TV set 1, the video signal at video output terminal 1*c* is identical to that actually on display at the screen of TV set 1. Therefore, the superimposed channel number detection at apparatus 3 can be achieved regardless of whether the video signal is from CS digital broadcast receiver (or CATV broadcast receiver) 2 or from ground wave broadcast received and demodulated by TV set 1 itself.

Therefore, in this embodiment, the video signal from video output terminal 1*c* of TV set 1 is supplied to input terminal 3*a* of channel selection monitoring apparatus 3, so as to permit apparatus 3 to identify the channel number under viewing at TV set 1. When CS digital broadcast receiver 2 is selected as a source by the viewer, the video signal is that from a certain channel of the CS digital broadcast. When such source selection is not made, the video signal is that from a certain channel of ground wave broadcast demodulated and reproduced at TV set 1 itself.

Since monitored areas are set at memory 321 to accommodate the superimposed channel numbers for both the CS broadcast (CATV broadcast) and the groundwave broadcast, with dictionaries registered at dictionary storage 331 for characters constituting channel numbers for both broadcast formats, image extraction means 322 can extract the binary images of monitored areas both formats, thereby to permit comparison means 332 to detect the channel numbers from the respective images. It should be also noted that broadcast channel number storage 334 in this embodiment is arranged to store all the possible channel numbers of CS digital (CATV) broadcast and ground wave broadcast channels.

While the preferred embodiments of the present invention have been described above, the present invention is not limited to these embodiments but it permits various additions and modifications. For example, the illustrated three-digit channel numbers having numbers 0 to 9 for each digit are not limited to numbers having three digits. Also, the channel number may include alphabets. In that event, dictionary storage 331 can be modified without any difficulty to register those alphabets additionally.

Also, CS digital broadcast receiver 2 need not be a stand-alone equipment as in the preferred embodiment. It can be integrated with TV set 1 if it has video output terminal 2*a* to readily permit the CS digital broadcast video output to be supplied not only to TV set 1 but also to channel selection monitoring apparatus 3.

Furthermore, if the image displayed at TV set 1 is in a special mode, such as the so-called "double window mode, in which two programmings from two separate broadcast stations are put on a single display screen simultaneously, with characters such as double picture frame" superimposed on the image on display, such characters can be readily identified by way of defining in advance the superimposition areas in monitored area memory 321 and registering in dictionary storage 331 the characters constituting the character sequences, because the positions of the superimposition are predetermined and characters used are also prefixed. In such mode, it is needless to say that all the characters employed for such special mode are stored in advance in broadcast channel number storage 334. The above-mentioned special mode includes the reception of the so-called "character broadcast," in which brief subtitle is broadcast utilizing the vertical blanking signal period with captions superimposed indicating the reception of character broadcast signal.

While the invention has been described in connection with its preferred embodiments, it is to be understood that the invention is not limited to the disclosed embodiment. On the contrary, the invention is intended to cover various modifications and equivalent arrangements included within the spirit and scope of the appended claims.

We claim:

1. A television channel selection monitoring apparatus for monitoring reception status of a television receiver means coupled to a display means for the display of an image responsive to an input video signal supplied to said display means, said television receiver means being for selecting one of a plurality of television channels broadcast through a communication satellite (CS) in digital form, a communication satellite (CS) in conventional form, digital or conventional CATV or ground wave broadcast system, and providing to said display means as said input video signal a video signal received through said selected one of the television channels, said input video signal having a predetermined channel number indication section for indicating, on said display means for a predetermined duration every time channel selection is made at said television receiver means, a channel number generated locally at said television receiver means for each of said television channels, wherein said apparatus comprises:

means for digitizing said video signal and temporarily storing a digitized video signal from said digitizing means for at least a part of each frame of said video signal;

means for extracting out of said digitized video signal an image section corresponding to said channel number indication section, thereby to provide a digitized image of said channel number;

means responsive to said digitized image of said channel number for identifying said digitized image as a channel number to which said television receiver means is tuned; and means for outputting said channel number as an element of said reception status, wherein the output of said apparatus is validated only when a CS digital signal reception/CATV broadcast reception indication signal is at an active level, said indication signal being provided by CS digital broadcast reception/CATV broadcast reception detection means having:

synchronizing signal separator means for detecting vertical and horizontal hold signals (V,H) from said video signal;

waveform shaping means for shaping outputs from vertical and horizontal hold signals sensors located adjacent to electromagnetic coils for vertical and horizontal deflection of electron beams at said display means; and phase comparator means for phase-comparing the outputs from said synchronizing signal separation means and said waveform shaping means, thereby to provide said CS digital signal reception/CATV broadcast reception indication signal at said active level only when there is phase coincidence in both horizontal and vertical hold signals supplied from both said synchronizing signal separator means and said waveform shaping means, and wherein said indication signal is supplied to an external utilization device together with said output of said apparatus for validation only when said indication signal is at an active level.

2. A television channel selection monitoring apparatus according to claim 1, wherein said image section extracting means comprises a memory for storing data defining the area corresponding to said image section, and means for extracting a part of said digitized video signal based on the output of said memory; and wherein said channel number identifying means comprises a dictionary storage means for storing all the possible numerals and letters constituting said channel number, comparison means for comparing said digitized image with the output of said dictionary storage means on a digit by digit basis to provide a comparison output when there is coincidence, broadcast channel number storage means for storing all the channel numbers receivable by said television receiver means, and means for checking the coincidence between said comparison output and each of said channel numbers to identify it when there is coincidence.

3. A television channel selection monitoring apparatus according to claim 1, wherein said television receiver means is a CS digital broadcast receiver for receiving television signals broadcast through a communication satellite (CS) in digital form.

4. A television channel selection monitoring apparatus according to claim 1, wherein said television receiver means is a CATV broadcast receiver for receiving television signals in broadcast through a CATV broadcast network.

5. A television channel selection monitoring apparatus according to claim 1, wherein said CS digital broadcast receiver is a stand-alone unit, and wherein said display means is a part of a television (TV) set coupled to said CS digital broadcast receiver.

6. A television channel selection monitoring apparatus according to claim 2, wherein said CATV broadcast receiver is a stand-alone unit, and wherein said display means is a part of a television (TV) set coupled to said CATV broadcast receiver.

* * * * *